United States Patent
Porter et al.

(10) Patent No.: US 6,925,162 B1
(45) Date of Patent: Aug. 2, 2005

(54) METHOD AND SYSTEM FOR NEGOTIATED CALL FORWARDING

(75) Inventors: Kelvin Porter, Dallas, TX (US); Carol Waller, Allen, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/397,578

(22) Filed: Sep. 16, 1999

(51) Int. Cl.[7] .............................................. H04M 3/42
(52) U.S. Cl. ............................ 379/211.02; 379/211.01; 379/214.01; 379/265.09
(58) Field of Search .................... 379/142.07, 142.09, 379/207.05, 207.08, 207.09, 211.01, 211.02, 212.01, 214.01, 265.09, 67.1, 142, 211, 212, 265, 267, 900; 348/14, 14.03, 14.08, 14.09, 14.1; 370/260, 261

(56) References Cited

U.S. PATENT DOCUMENTS

| | | | | |
|---|---|---|---|---|
| 4,878,239 A | * | 10/1989 | Solomon et al. | 379/88.23 |
| 5,018,191 A | * | 5/1991 | Catron et al. | 379/100.09 |
| 5,033,079 A | * | 7/1991 | Catron et al. | 379/93.14 |
| 5,062,133 A | * | 10/1991 | Melrose | 379/93.11 |
| 5,274,700 A | * | 12/1993 | Gechter et al. | 379/211.01 |
| 5,361,295 A | * | 11/1994 | Solomon et al. | 379/67.1 |
| 5,444,477 A | * | 8/1995 | Yamadera et al. | 348/14.07 |
| 5,511,111 A | * | 4/1996 | Serbetcioglu et al. | 379/67.1 |
| 5,553,128 A | * | 9/1996 | Grimes | 379/211.02 |
| 5,839,065 A | | 11/1998 | Joensuu et al. | |
| 5,946,386 A | * | 8/1999 | Rogers et al. | 379/265 |
| 6,041,103 A | * | 3/2000 | La Porta et al. | 379/67.1 |
| 6,041,114 A | * | 3/2000 | Chestnut | 379/211.02 |
| 6,292,549 B1 | * | 9/2001 | Lung et al. | 379/142.01 |
| 6,404,513 B1 | * | 6/2002 | Denker | 358/407 |

FOREIGN PATENT DOCUMENTS

EP          0924918          6/1999

* cited by examiner

Primary Examiner—Bing Q. Bui

(57) ABSTRACT

A call forwarding system that prevents unwanted call forwarding activations from taking place. The system requests approval prior to activating call forwarding. The approval is obtained by sending a request communication to the destination to which calls are to be forwarded. The destination has the option of accepting the request for call forwarding or rejecting the request. The call forwarding may be applied to phone calls between electronic devices and to forwarding of video communication sessions over computer networks.

25 Claims, 4 Drawing Sheets

US 6,925,162 B1

METHOD AND SYSTEM FOR NEGOTIATED CALL FORWARDING

BACKGROUND

The present invention relates generally to telecommunication systems and, more particularly, to a method and system for negotiated call forwarding.

Call forwarding allows calls that would otherwise be directed to a first destination to be redirected automatically to a second destination. For example, suppose that a businessman is scheduled to be in a conference all morning but is expecting an important telephone call. Call forwarding may be activated so that all calls that would, otherwise, be directed to the office telephone of the businessman are forwarded automatically to the telephone in the conference room. The redirecting of the phone calls is performed automatically by a local switching device that is configured to perform the call forwarding. When the business meeting is over, the businessman may deactivate the call forwarding so that calls reach the businessman at his office telephone.

When a party wishes to activate call forwarding, it is presumed that the party has gained permission to forward calls to the new destination. Unfortunately, the party may have not obtained such permission. Additionally, improper or abusive forwarding of calls for multi-media sessions can be very costly for the calling or called party because multi-media calls consume a large amount of bandwidth, which is very expensive. Moreover, this conventional approach to call forwarding is ripe for abuse in that a malicious party may intentionally forward calls to a destination for which approval has not been obtained.

SUMMARY

The present invention addresses the limitations of conventional call forwarding systems by contacting a party at the destination to which calls are to be forwarded to obtain approval before activating call forwarding.

In accordance with one aspect of the present invention, a request is received to forward calls directed toward a first destination to a second destination. The second destination is contacted to obtain approval for forwarding the calls. If approval is not obtained, the request to forward calls is denied. Where approval is obtained, the request to forward calls is granted.

In accordance with another aspect of the present invention, a method is practiced in a telecommunications network having a first computer system and a second computer system. Per this method, a configuration is provided wherein a video communication session is initially directed to the first computer system. A request is received to direct the video communication session to the second computer system. A communication is then sent to the second computer system to obtain approval of the request. Where the approval is obtained, the video communication session is redirected to the second computer system.

In accordance with a further aspect of the present invention, a call forwarding system includes a switch for forwarding calls directed to a first destination to a second destination when call forwarding is activated. The call forwarding system includes approval logic for contacting the second destination to obtain approval for the forwarding of calls before call forwarding is activated.

DETAILED DESCRIPTION

The illustrative embodiment of the present invention obtains approval prior to activating call forwarding. In particular, when a party requests to forward calls destined for a first destination to a second destination, the illustrative embodiment contacts the second destination to obtain approval for the call forwarding. If approval is obtained, the call forwarding is activated. If approval is not obtained, call forwarding is not activated.

The approval is obtained by sending a communication to the second destination to which calls are to be forwarded. This communication may be a telephone call that is placed to the second destination. The telephone call requests approval for the call forwarding. The telephone call may be initiated by a live operator or by an automated operator. An interactive voice response (IVR) unit may be used to request and obtain approval.

Approval may also be obtained for the forwarding of video communication sessions, such as video conferencing sessions. Techniques similar to those employed for call forwarding may be employed to obtain approval for the forwarding of video communication sessions.

One embodiment provides a party at a destination, to which calls may be forwarded, control over what calls are forwarded to the destination. This ensures that the party is not inundated with forwarded calls and ensures that the party does not receive unwanted calls due to call forwarding.

Figure 1:
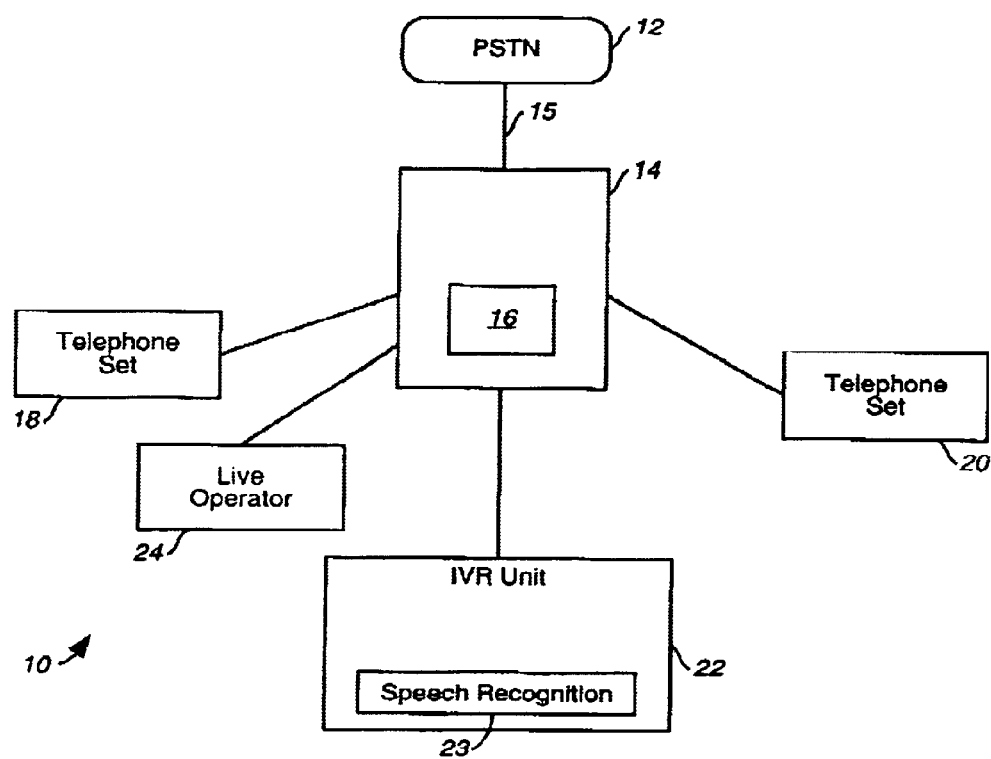
FIG. 1 depicts a portion of a telecommunication network that is suitable for practicing the illustrative embodiment of the present invention.

Referring now to FIG. 1, a portion of a telecommunication network 10 includes a switch 14 that is connected to a public switched telephone network (PSTN) 12. The switch 14 may take many different forms. Those skilled in the art will appreciate that a variety of different types of switches may be utilized to practice the present invention. For example, the switch 14 may be a private branch exchange (PBX) or an automatic call distributor (ACD). For the illustrative case depicted in FIG. 1, it is presumed that the switch 14 is a PBX. The depiction of a PBX, in FIG. 1, is intended to be merely illustrative and not limiting of the present invention. Calls are received from the PSTN 12 over a voice trunk 15 that connects the PSTN 12 with the switch 14. Calls may be received from the PSTN 12 and directed to telephone sets 18 and 20. Calls may also be directed to a live operator 24 and an IVR unit 22. The switch 14 may use a number of different tables 16 to assist it in directing incoming calls.

The IVR unit 22 is a self-contained computer platform. The IVR unit 22 offers a wide range of services, including the playing of voice messages and the acceptance of dual tone multi-frequency (DTMF) digits. The IVR unit 22 includes storage and a processor for executing applications and scripts to provide services. The IVR unit 22 may also include a speech recognition module 23, which is discussed below.

Figure 2:
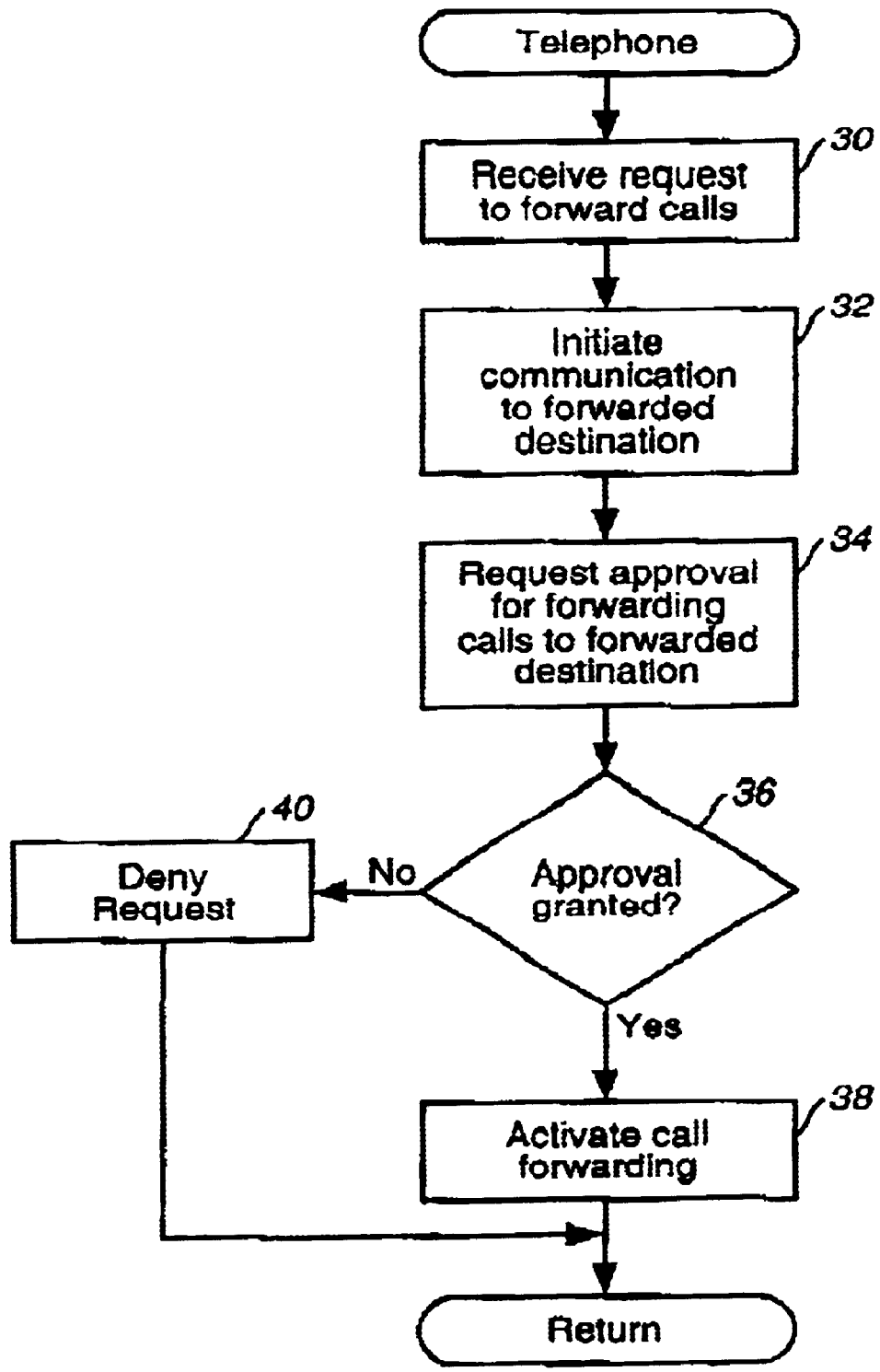
FIG. 2 is a flow chart illustrating the steps that are performed when a request to forward calls is received in the illustrative embodiment.

Referring now to FIG. 2, at step 30, a request is received from a party to forward calls to a destination. The request may be initiated by the party dialing a predetermined number to request the call forwarding. Alternatively, the party may enter predefined key sequences that are received by the switch 14 to request call forwarding. Those skilled in the art will appreciate that a number of different approaches may be used for the party to request call forwarding. The party must identify the destination to which calls are currently directed and the new destination to which calls are to be forwarded. This may entail providing telephone numbers or extensions. The request may be received by an intelligent platform or by a live operator 24.

When the request to activate call forwarding is received, at step 32, a communication is initiated to the forwarded destination. For example, suppose a party wishes for calls that are normally destined to telephone set 18 to be directed to telephone set 20 and the party submits a call forwarding request. After such a request is received by switch 14, a communication is initiated to telephone set 20. This communication may be a telephone call that is placed by a live operator 24 to the telephone set 20 or may alternatively be an automated call that connects the IVR unit 22 with the telephone set 20.

At step 34, the communication requests approval for forwarding the calls to the forwarded destination. For example, the live operator 24 may ask the party that answers the telephone set 20 whether the party agrees to accept calls forwarded from telephone set 18. Alternatively, the IVR unit 22 may play a recorded audio message that asks the party that answers telephone set 20 for approval. The party may then provide a response. The IVR unit 22 may record the response. Upon receipt of the response, speech recognition module 23 may be used to determine whether an approval or rejection of the request was received from the party that answered the telephone set 20. In this fashion, at step 36, it is determined if approval is granted. If approval is granted, then at step 38, call forwarding is activated. Call forwarding is activated by configuring the table 16 and the switch 14 to direct all calls directed to the initial destination to the forwarded destination. Thus, for the example case discussed above, the tables 16 are configured, upon receiving approval, to direct calls destined for telephone set 18 to telephone set 20. Conversely, if approval is not granted, then at step 40, the request is denied such that no call forwarding is performed.

Figure 3:
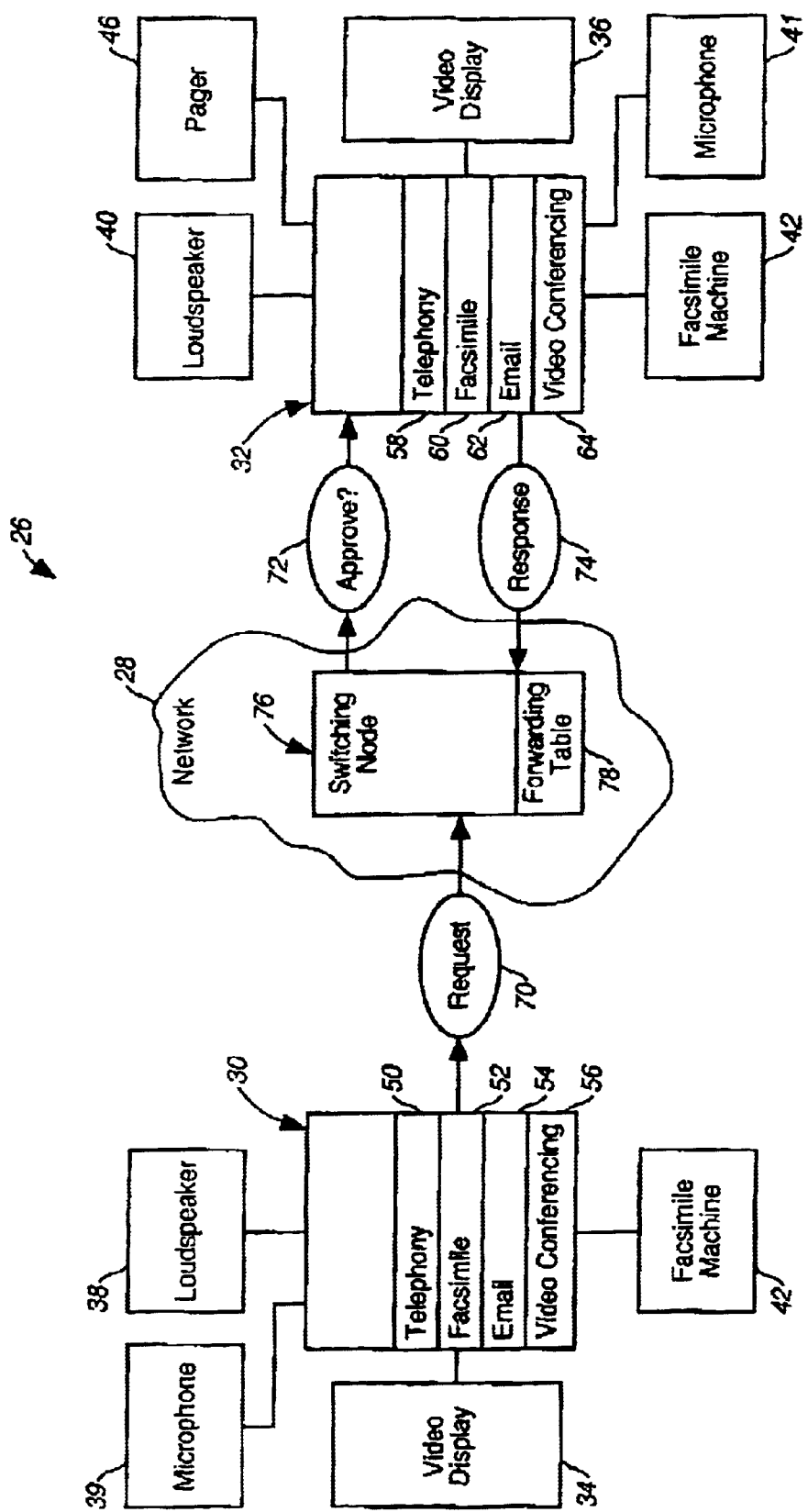
FIG. 3 depicts an alternative configuration of a network for practicing the illustrative to embodiment of the present invention.

Referring now to FIG. 3, a network 26 includes computer systems 30 and 32. Communication between the computer systems 30 and 32 takes place over a network 28. The network 28 may be a local area network (LAN), a wide area network (WAN), or even a hybrid of computer networks and telecommunication networks. For example, the network 28 may be the Internet, an intranet, or an extranet, amongst other types of networks. The computer system 30 includes a telephony support 50 so that telephone calls may be initiated and received by the computer system 30. The computer system 30 is coupled to a microphone 39 for receiving audio input and a loudspeaker 38 for outputting audio output. Likewise, the computer system 32 includes a telephony support 58 and is coupled to a microphone 41 and a loud speaker 40. Both computer systems 30 and 32 are coupled to video displays 34 and 36, respectively, for displaying video images. Both computer systems 30 and 32 also include facsimile support 52 and 60, respectively, for receiving and sending facsimile communications. The computer systems 30 and 32 may also have an interface with facsimile machines 42 and 44, respectively. The computer system 30 includes support for electronic mail (email) 54 and for video conferencing 56. The computer system 32 also includes support for email 62 and video conferencing 64.

The phone calls that are redirected by call forwarding need not be strictly phone calls between two live persons, but rather can be communications between facsimile machines 42 and 44 or modem to modem phone calls.

The communication that requests approval and the response that is provided to approve or reject the request for call forwarding need not be strictly a telephone communication. For example, the communications may be facsimile communications, email communications, and even electronic pages. In FIG. 3, computer system 32 has a pager 46 that can accept pages. The pager 46 may be a two-way pager that is capable of generating responses.

In the example of FIG. 3, suppose that the computer system 30 wishes to forward communications, such as a phone call or video conferencing session, to computer system 32. Computer system 30 generates a request 70 for call forwarding. The request 70 is received by an intelligent platform. This intelligent platform may be a digital switch or other intelligent services platform, such as a switching node 76 within the network 28. The switching node 76 may hold a forwarding table 78 that identifies how packets received at the switching node 76 are forwarded. The switching node 76 generates a communication 72 that requests approval for the forwarding from computer system 32. Computer system 32 generates a response 74 that is received by the switching node 76. Depending upon the response 74, the switching node 76 configures the forwarding table 78 appropriately to support forwarding or to not support forwarding.

Figure 4:
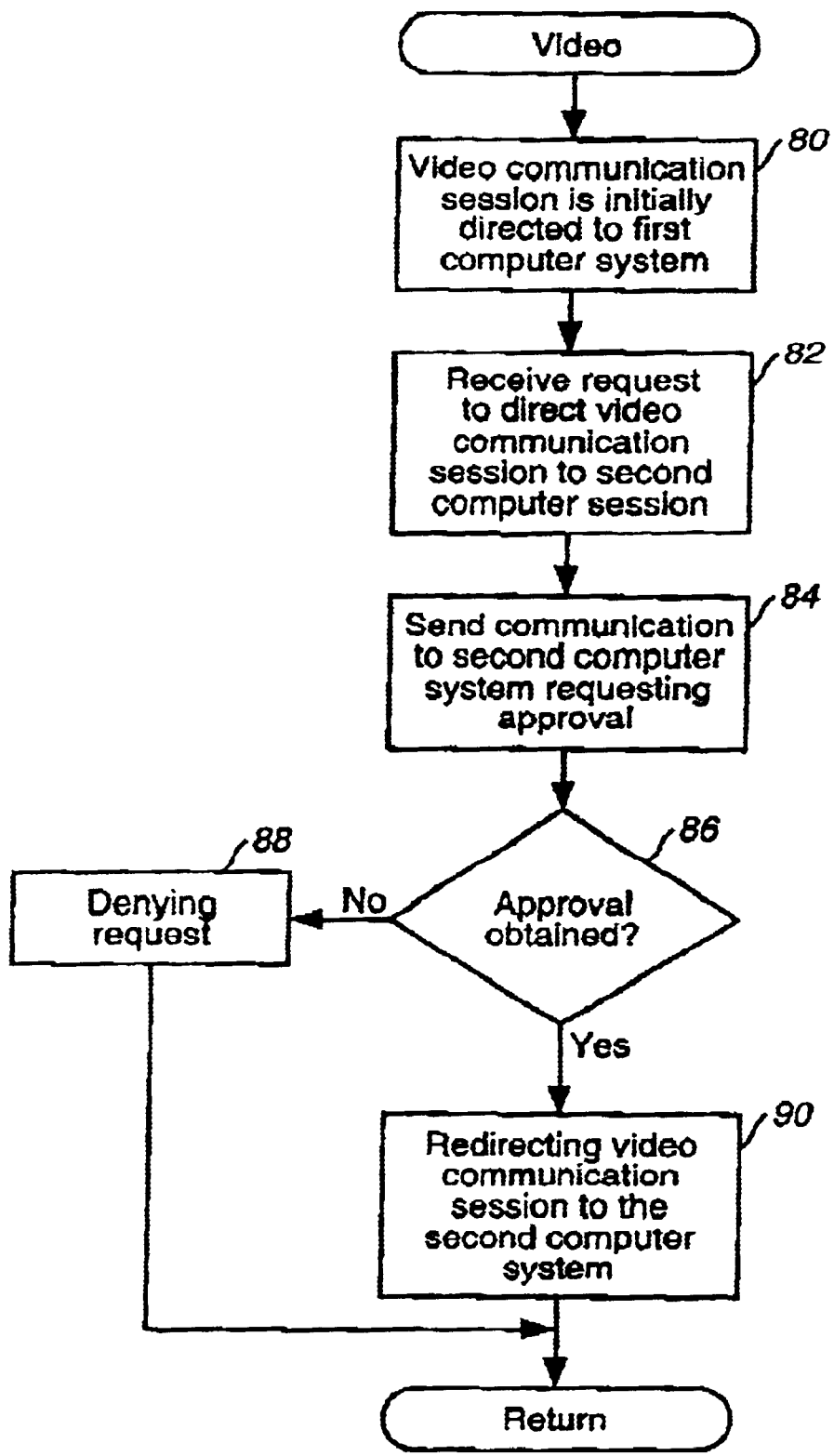
FIG. 4 is a flow chart illustrating the steps that are performed to forward a video communication session in the illustrative embodiment.

FIG. 4 is a flow chart illustrating the steps that are performed for practicing the illustrative embodiment to forward a video conferencing session in the alternative configuration of FIG. 3. It is presumed that the video conferencing supports 56 and 64 on the respective computer systems 30 and 32 generate data that is transmitted in IP packets over the network 28. These IP packets are received by the switching node 76. The switching node 76 accesses the forwarding table 78 to determine where to forward the packets in order to guide the packets to their appropriate destinations. The packets are directed to the desired destination to complete transmittal of the video communication information for a session.

At step 80, the video communication session is directed to a first computer system, such as computer system 30 in FIG. 3. At step 82, the request 70 is then generated and forwarded from the computer system 30 to request the forwarding of the video communication session to a second computer, system, such as computer system 32. This communication is sent to a designated platform, such as the switching node 76 within the network 28. At step 84, the designated platform sends a communication to the second computer system 32 requesting approval of the forwarding. This communication may take the form of an email message, a facsimile message, a page, an interruption of a video conference, or the like. The communication may request that the computer system 32 respond directly to the switching node 76 or that the computer system 32 visit a designated location, such as a designated web site to approve or reject the request. At step 86, if approval is obtained, then at step 90, the audio communication session is redirected to the second computer system 32. On the other hand, if approval is not obtained, then at step 88, the request is denied and no forwarding of the video communication session takes place.

While the present invention has been described with reference to an illustrative embodiment thereof, those skilled in the art will appreciate that various changes in form and detail may be made without departing from the intended scope of the present invention as defined in the appended claims. For example, different telecommunication network configurations and computer networks configurations than shown in the Figures may be used to practice the present invention.

What is claimed is:

1. In a telecommunications network, a method comprising the steps of:

receiving a request to forward a call supporting a facsimile communication or a modem communication directed to a first destination to a second destination; and contacting the second destination to obtain an approval for the request to forward the call from the first destination to the second destination.

2. The method of claim 1 further comprising the step of denying the request to forward the call when the approval is not obtained.

3. The method of claim 1 further comprising the step of granting the request to forward the call when the approval is obtained.

4. The method of claim 1, wherein the step of contacting comprises calling the second destination and requesting the approval.

5. The method of claim 4, wherein the telecommunications system includes an interactive voice response (IVR) unit that generates a voice message for requesting the approval.

6. The method of claim 1, wherein the first destination is a telephone set.

7. The method of claim 1, wherein the first destination is a computer system with telephony capabilities for placing a call.

8. The method of claim 7, wherein the second destination is a computer system with telephony capabilities for receiving a call.

9. The method of claim 1, wherein the second destination is a computer system with telephony capabilities for receiving a call.

10. The method of claim 1, wherein the second destination is a telephone set.

11. The method of claim 1, further comprising the step of automatically forwarding the call when the approval is obtained.

12. In a telecommunications network having a first computer system and a second computer system, a method comprising the steps of:

providing a configuration wherein a video communication session is initially directed to the first computer system;

receiving a request to direct the video communication session to the second computer system;

sending a communication to the second computer system to obtain approval of the request; and redirecting the video communication session to the second computer system when the approval is obtained.

13. The method of claim 12, wherein the video communication session is a video conferencing session.

14. The method of claim 12, wherein the step of sending the communication comprises sending an electronic mail message.

15. The method of claim 12, wherein the step of sending the communication comprises sending a video mail message.

16. The method of claim 12, wherein the step of sending the communication comprises sending a facsimile.

17. The method of claim 12, wherein the step of sending the communication comprises placing a phone call.

18. The method of claim 12 further comprising the step of denying the request when the approval is not obtained.

19. A call forwarding system comprising:

a switch for directing a call supporting a facsimile communication or a modem communication intended for a first destination to a second destination when call forwarding is activated; and approval logic coupled to the switch for contacting the second destination to obtain approval for the request to direct the calls from the first destination to the second destination before call forwarding is activated.

20. The call forwarding system of claim 19, wherein the switch is a private branch exchange (PBX).

21. The call forwarding system of claim 19, wherein the approval logic comprises an interactive voice response unit for generating a verbal message soliciting the approval for the directing of the calls.

22. The call forwarding system of claim 19, wherein call forwarding is not activated if the approval for the directing of the calls is not obtained.

23. A method of processing a multi-media call, the method comprising:

receiving a request to forward the multi-media call directed to a first destination to a second destination; and obtaining an approval for the request from the second destination to forward the multi-media call from the first destination to the second destination.

24. The method of claim 23, wherein the multi-media call supports one of a facsimile session, an email session, a paging session, and a video session.

25. The method of claim 23, wherein the approval is obtained via a web interface.

\* \* \* \* \*